(12) United States Patent
Wagoner et al.

(10) Patent No.: US 9,088,203 B2
(45) Date of Patent: Jul. 21, 2015

(54) CURRENT BALANCE FOR A MULTI-PHASE ELECTRIC POWER CONVERTER AND METHOD FOR OPERATING THE SAME

(75) Inventors: Robert Gregory Wagoner, Roanoke, VA (US); Paul Stephen Pate, Troutville, VA (US)

(73) Assignee: General Electric Company, Schenectady, NY (US)

( * ) Notice: Subject to any disclaimer, the term of this patent is extended or adjusted under 35 U.S.C. 154(b) by 77 days.

(21) Appl. No.: 13/558,479

(22) Filed: Jul. 26, 2012

(65) Prior Publication Data

US 2014/0029322 A1 Jan. 30, 2014

(51) Int. Cl.
*H02M 7/48* (2007.01)
*H02M 7/00* (2006.01)
*H02M 7/493* (2007.01)

(52) U.S. Cl.
CPC .............. *H02M 7/003* (2013.01); *H02M 7/493* (2013.01)

(58) Field of Classification Search
USPC ................ 363/71, 95–98, 131, 132, 135, 137
See application file for complete search history.

(56) References Cited

U.S. PATENT DOCUMENTS

| | | | |
|---|---|---|---|
| 5,576,944 A * | 11/1996 | Uchino | ............................ 363/71 |
| 7,170,180 B2 | 1/2007 | Wagoner | |
| 2006/0131668 A1 | 6/2006 | Wagoner | |
| 2008/0186751 A1 * | 8/2008 | Tokuyama et al. | ........... 363/131 |
| 2011/0233608 A1 | 9/2011 | Cottet et al. | |
| 2012/0043960 A1 * | 2/2012 | Huebler | ...................... 324/76.39 |
| 2013/0265724 A1 * | 10/2013 | Kaneko et al. | ................ 361/715 |

FOREIGN PATENT DOCUMENTS

EP 1 956 704 A2 8/2008

OTHER PUBLICATIONS

John C. Joyce, Current Sharing and Redistribution in High Power IGBT Modules, Dissertation submitted to the University of Cambridge for the Degree of Doctor of Philosophy, Clare College, 2001, 160 pages.
Dynex Semiconductor, Parallel Operation of Dynex IGBT Modules, 2002, 5 pages, www.dynexsemi.com.
Dr. Arendt Wintrich, Module Design and Parellleling IGBT, Semikron, Innovation and Service, 2011, 34 pages.
Aluminum Electrical Conductor Handbook, Bus Conductor Design and Applications, Section IV, Chapter 13, 70 pages, http://www.aluminum.org/Content/NavigationMenu/TheIndustry/Electrical/Aluminum_Electrical_htm.

(Continued)

*Primary Examiner* — Adolf Berhane
*Assistant Examiner* — Alex Torres-Rivera
(74) *Attorney, Agent, or Firm* — James McGinness, Esq.; Armstrong Teasdale LLP

(57) ABSTRACT

A power converter includes a plurality of semiconductor switching devices coupled in a parallel configuration and positioned proximate each other in an interlaced configuration with respect to a plurality of electrical phases. The interlaced configuration facilitates inducing an electric current flow through each semiconductor switching device of the plurality of semiconductor switching devices that cancels at least a portion of current imbalances between at least a portion of the plurality of semiconductor switching devices.

16 Claims, 7 Drawing Sheets

(56) References Cited

OTHER PUBLICATIONS

Martin, C., et al., "Analysis of Electromagnetic Coupling and Current Distribution Inside a Power Module", IEEE Transactions on Industry Applications, IEEE Service Center, Piscataway, NJ, USA, vol. 43, No. 4, Jul. 1, 2007, pp. 893-901, XP011187793, ISSN: 0093-9994.

International Search Report issued in connection with PCT/US2013/046100; Nov. 8, 2013.

* cited by examiner

CURRENT BALANCE FOR A MULTI-PHASE ELECTRIC POWER CONVERTER AND METHOD FOR OPERATING THE SAME

BACKGROUND OF THE INVENTION

The subject matter described herein relates generally to electric power converters, and more specifically, to decreasing current imbalances within electric power converters.

Generally, a wind turbine includes a rotor that includes a rotatable hub assembly having multiple blades. The blades transform wind energy into a mechanical rotational torque that drives one or more generators via the rotor. At least some of the known wind turbines are physically nested together in a common geographical region to form a wind turbine farm. Variable speed operation of the wind turbine facilitates enhanced capture of energy when compared to a constant speed operation of the wind turbine. However, variable speed operation of the wind turbine produces electric power having varying voltage and/or frequency. More specifically, the frequency of the electric power generated by the variable speed wind turbine is proportional to the speed of rotation of the rotor. A power converter may be coupled between the wind turbine's electric generator and an electric utility grid. The power converter receives electric power from the wind turbine generator and transmits electricity having a regulated voltage and frequency for further transmission to the utility grid via a transformer. The transformer may be coupled to a plurality of power converters associated with the wind turbine farm.

Many known power converters include known semiconductor-based portions for electric power conversion, e.g., rectification portions and inverter portions. Most known rectification portions are used for converting alternating current (AC) to direct current (DC) and most known inverter portions are used for converting DC current to AC current. Many known semiconductor-based portions include power bridge circuits that include a plurality of power semiconductor switches, e.g., insulated gate bipolar transistors (IGBTs). The IGBTs are coupled in an electrically parallel configuration within an IGBT module. Also, a plurality of IGBT modules are coupled in an electrically parallel configuration within the rectification and inverter portions to increase the power ratings and reliability of the power converters. The IGBT modules are grouped by phase.

However, when IGBT modules are coupled in parallel, the electric currents transmitted through the modules do not balance evenly. The current imbalances are partially facilitated by electromagnetic fields induced by the currents conducted therethrough. The magnitude of the field strength is proportional to the magnitude of the electric current conducted through each IGBT module. The current imbalances are further facilitated by the interaction of transient current sharing features of the IGBTs and their associated circuits including different transfer characteristics of the IGBTs, for example, different gate threshold voltages. The IGBT with the lowest threshold voltage will turn-on and conduct first and turn-off last, thereby conducting longer than the other IGBTs. Such different conduction periods induce different temperature values in the IGBTs that induce different current values, different switching losses, and different thermal stresses while conducting in the on-state. Moreover, variations in stray inductances associated with IGBT emitters in different parallel IGBTs facilitate increasing such variations, i.e., imbalances in electric current conducted therethrough. Such current imbalances are typically manifested as higher currents on outside branches of IGBTs as compared to inside branches of IGBTs. In such instances, the highest stressed IGBT limits the power converter output, such that the lower stressed IGBTs do not conduct at their rated capabilities. Therefore, the outside branches attain current values close to their current ratings while the interior branches have remaining capacity, thereby limiting the total current flow through the power converter.

Alterations to individual IGBT circuits to compensate for current imbalances may provide some correction on a small scale. Examples of such circuit alterations include physically positioning conductors electrically coupled in parallel in transposed configurations. However, such small-scale solutions may not sufficiently affect current imbalances on larger scale devices, such as those associated with electric power converters for large generation facilities and large drive devices. Also, current balancing, or sharing, solutions for high current, e.g., in excess of 1000 amperes (amps), and lower frequency, e.g., 50/60 Hertz (Hz) devices, such as bus bars, are known. However, semi-conductor devices such as those used in electric power converters operate at lower currents, e.g., less than 1000 amps, and at higher frequencies, e.g., greater than 100 Hz. As such, greater power conversion capacity will necessitate either a greater number of power converters or larger power converters, both options requiring increased capital and operational costs.

BRIEF DESCRIPTION OF THE INVENTION

In one aspect, a power converter is provided. The power converter includes a plurality of semiconductor switching devices coupled in a parallel configuration and positioned proximate each other in an interlaced configuration with respect to a plurality of electrical phases. The interlaced configuration facilitates inducing an electric current flow through each semiconductor switching device of the plurality of semiconductor switching devices that cancels at least a portion of current imbalances between at least a portion of the plurality of semiconductor switching devices.

In another aspect, a method of operating a power converter is provided. The power converter includes a plurality of semiconductor switching devices coupled in a parallel configuration and positioned proximate each other in an interlacing configuration. The method includes coupling the power converter to a plurality of electric current phases. The method also includes placing at least a portion of the plurality of semiconductor switching devices in a conducting mode of operation and inducing an electric current flow through each of the conducting semiconductor switching devices. The method further includes canceling at least a portion of current imbalances between the plurality of conducting semiconductor switching devices comprising at least partially cancelling a magnetic flux induced proximate at least some of the conducting semiconductor switching devices.

In yet another aspect, an electric power system is provided. The electric power system includes at least one direct current (DC) conductor and at least one alternating current (AC) conductor. The system also includes a power converter coupled to each of the DC conductor and the AC conductor. The power converter includes a plurality of semiconductor switching devices coupled in a parallel configuration and positioned proximate each other in an interlaced configuration with respect to a plurality of electrical phases. The interlaced configuration facilitates inducing an electric current flow through each semiconductor switching device of the plurality of semiconductor switching devices that cancels at least a portion of current imbalances between at least a portion of the plurality of semiconductor switching devices.

DETAILED DESCRIPTION OF THE INVENTION

Figure 1:
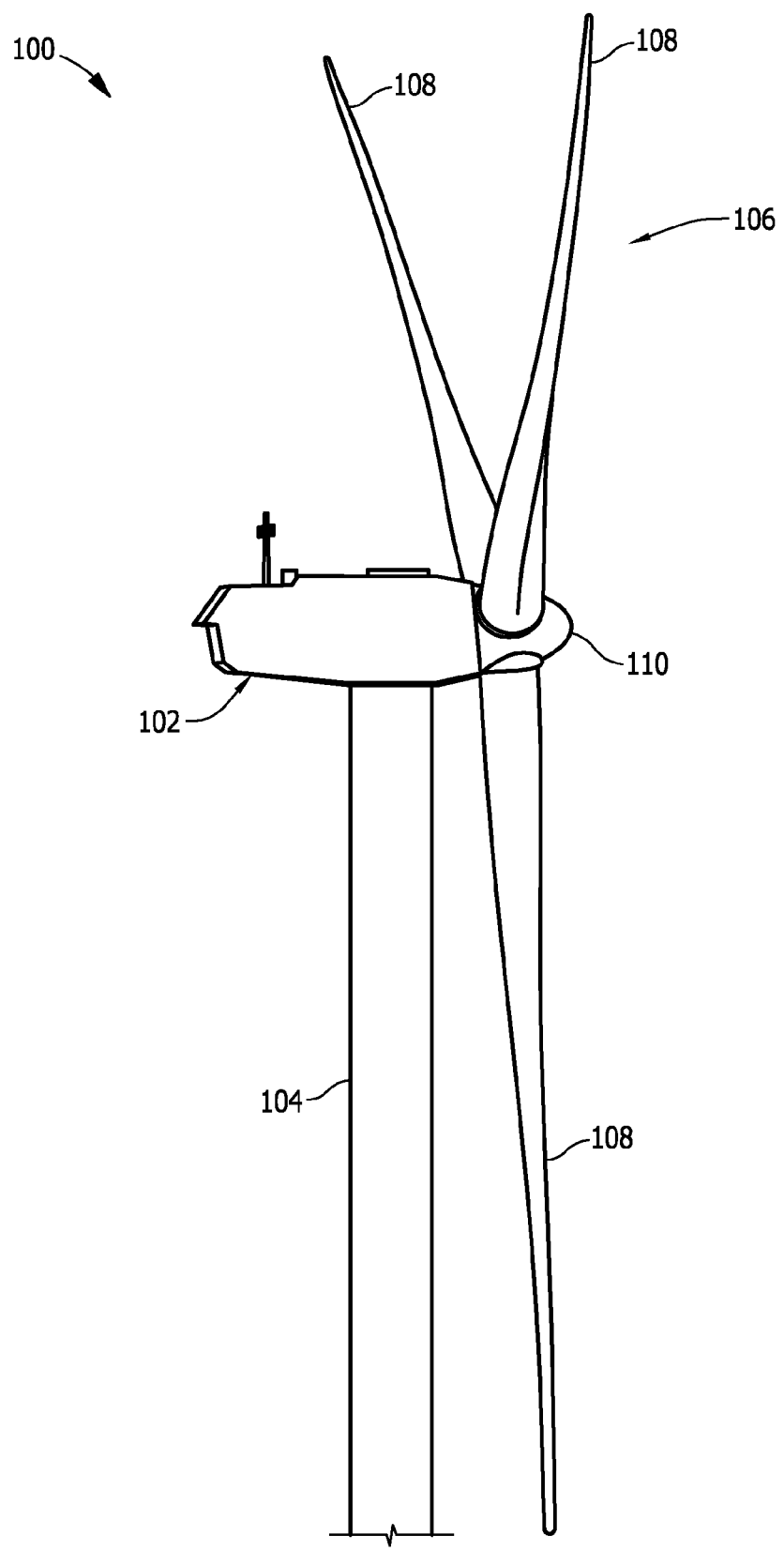
FIG. 1 is a schematic diagram of an exemplary power generation system.

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "electric power generation device" is intended to be representative of any device that provides electric power derived from an energy resource. As used herein, the term "wind turbine generator" is intended to be representative of any wind turbine that includes an electric power generation device that generates electrical power from rotational energy generated from wind energy, and more specifically, converts mechanical energy converted from kinetic energy of wind to electrical power.

Also, as used herein, the term "interlacing" is intended to be used to define a predetermined physical positioning of semiconductor-based phase legs into a predetermined interspersed distribution as a function of an associated alternating current (AC) phase. Such interlacing as used herein is contrasted with grouping a plurality of same-phase semiconductor-based phase legs in a parallel configuration without other-phase semiconductor-based phase legs positioned proximate to, and/or adjacent to, such same-phase semiconductor-based phase legs to facilitate balancing electric current flow through all semiconductor-based phase legs.

Technical effects of the methods, apparatus, and systems described herein include at least one of: (a) improving the output of power semiconductor assemblies; (b) balancing current sharing on electrically paralleled power semiconductor modules and substantially equalizing current flow through a plurality of channels defined by such power semiconductor assemblies; (c) canceling internal magnetic fluxes induced proximate adjacent power semiconductor assemblies; (d) increasing the output current of power converters as compared to other semiconductor assembly configurations; (e) increasing power ratings of power converters without equivalent increases in size and weight; and (f) increasing the reliability of power converters.

The methods, apparatus, and systems described herein facilitate transmitting electric power from renewable and non-renewable electric power generation assets. Also, the methods, apparatus, and systems described herein facilitate transmitting electric power to electric motor drive devices. Specifically, the methods, apparatus, and systems described herein facilitate generating and transmitting increased electric power using power converters with a smaller physical footprint. More specifically, the apparatus and systems described herein facilitate improving the current output of a plurality of parallel connected power semiconductors by substantially canceling out externally induced magnetic fields associated with adjacent power semiconductor devices. The equalization effects result in better sharing of current through each power semiconductor device and each output current conductor. Therefore, such power semiconductor configurations facilitates use of compact power converters with sufficient power ratings without similarly increasing the size of the power converters.

Although generally described herein with respect to a wind turbine facility, the systems described herein are applicable to any type of electric systems including, for example, and without limitation, renewable energy sources such as solar power generation systems, fuel cells, geothermal generators, hydropower generators, non-renewable energy sources such as fossil and nuclear power plants, and motor drive devices.

FIG. 1 is a schematic view of an exemplary wind turbine generator 100. Wind turbine generator 100 is an electric power generation device including a nacelle 102 housing a generator (not shown in FIG. 1). Nacelle 102 is mounted on a tower 104 (a portion of tower 104 being shown in FIG. 1). Tower 104 may be any height that facilitates operation of wind turbine generator 100 as described herein. Wind turbine generator 100 also includes a rotor 106 that includes three rotor blades 108 attached to a rotating hub 110. Alternatively, wind turbine generator 100 includes any number of blades 108 that facilitates operation of wind turbine generator 100 as described herein. In the exemplary embodiment, wind turbine generator 100 includes a gearbox (not shown in FIG. 1) rotatably coupled to rotor 106 and a generator (not shown in FIG. 1). While only one wind turbine generator 100 is shown, a plurality of wind turbine generators 100 may be at least partially grouped geographically and/or electrically to define a renewable energy generation facility, i.e., a wind turbine farm (not shown in FIG. 1). Such a wind turbine farm may be defined by a number of wind turbine generators 100 in a particular geographic area, or alternatively, defined by the electrical connectivity of each wind turbine generator 100 to a common substation.

Figure 2:
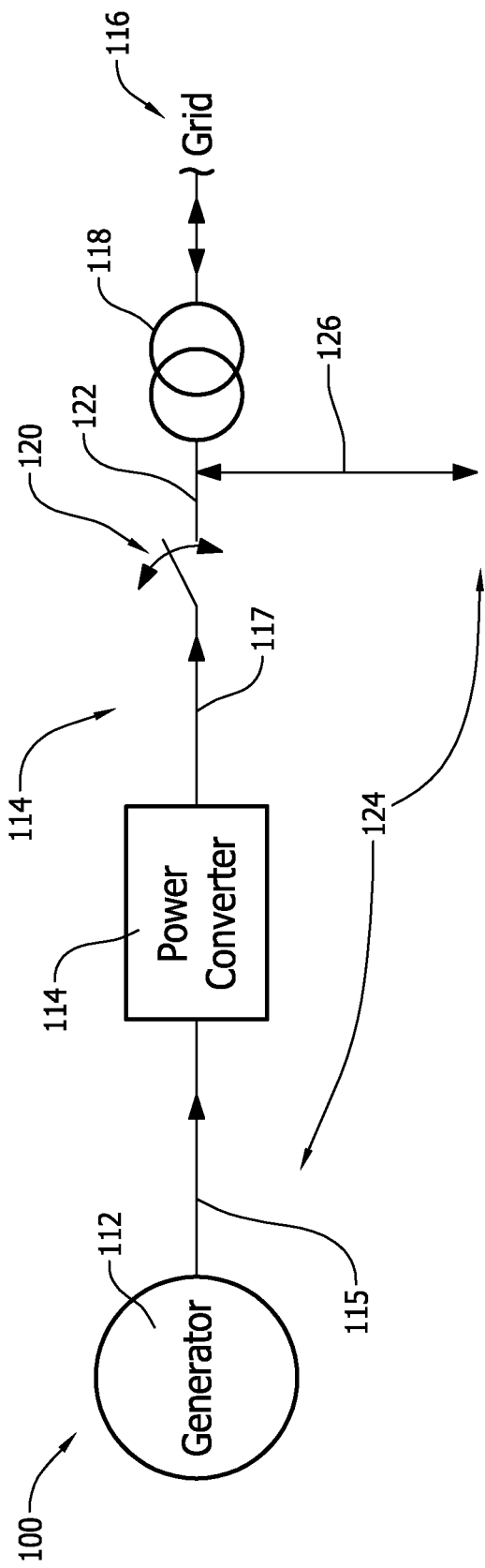
FIG. 2 is a schematic view of an exemplary power conversion and transmission system that may be used with the power generation system shown in FIG. 1.

FIG. 2 is a schematic view of an exemplary power conversion and transmission system 111 that may be used with wind turbine generator 100. Wind turbine generator 100 is a renewable energy source that includes an electric power generator 112 coupled to a first power source, i.e., a power converter 114, through a plurality of input conductors 115 (only one shown in FIG. 2). Electric power generator 112 is any type of generator that enables operation of wind turbine generator 100 as described herein, including, without limitation, a synchronous permanent magnet generator (PMG), an electrically excited synchronous generator (EESG), and a doubly-fed induction generator (DFIG).

Power converter 114 is any device that enables operation of wind turbine generator 100 as described herein, including, without limitation, a full power conversion assembly. In the exemplary embodiment, electrical, three-phase, sinusoidal, AC power is generated within electric power generator 112 and is transmitted to power converter 114 through input conductors 115. Within power converter 114, the electrical power is rectified in a converter portion (not shown in FIG. 2) from sinusoidal, three-phase AC power to direct current (DC) power. The DC power is transmitted to an inverter (not shown in FIG. 2) that converts the DC electrical power to three-phase, sinusoidal AC electrical power with regulated voltages, currents, and frequencies. Power converter 114 compensates or adjusts the frequency of the three-phase power from electric power generator 112 for changes, for example, in the wind speed at hub 110 and blades 108 (both shown in FIG. 1). Therefore, in this manner, mechanical and electrical rotor frequencies are decoupled from grid frequency.

Power converter 114 is coupled to an electric power grid 116 via a plurality of output conductors 117 (only one shown in FIG. 2), a main transformer 118, a main transformer circuit breaker 120, and a main transformer bus 122. When circuit breaker 120 is closed, three-phase AC electric power is transmitted from power converter 114 to electric power grid 116 for further transmission and distribution.

While only one wind turbine generator 100 is shown, a plurality of wind turbine generators 100 may be at least partially grouped geographically and/or electrically to define a renewable energy generation facility, i.e., a wind turbine farm 124. Each wind turbine generator 100 is coupled to main transformer bus 122 through a substation bus 126. Such wind turbine farm 124 may be defined by a number of wind turbine generators 100 in a particular geographic area, or alternatively, defined by the electrical connectivity of each wind turbine generator 100 to a common substation.

In some alternative embodiments, a combination of electric power generation devices are used in conjunction with, or in place of, wind turbine generator 100. In at least one alternative embodiment, wind turbine generator 100 is replaced with solar panels (not shown) coupled to form one or more solar arrays (not shown) to facilitate operating at a desired power output with supplemental, solar-generated power. Solar panels include, in one alternative embodiment, one or more of a photovoltaic panel, a solar thermal collector, or any other device that converts solar energy to electrical energy. In such alternative embodiments, each solar panel is a photovoltaic panel that generates a substantially direct current power as a result of solar energy striking solar panels.

Also, in such alternative embodiments, each solar array is coupled to a power converter that is similar to at least a portion of power converter 114 that converts the DC power to AC power that is transmitted to a transformer similar to transformer 118 and then to grid 116. Furthermore, although generally described herein with respect to wind turbine generator 100 and a solar array facility, the methods and systems described herein are applicable to any type of electric generation system including, for example, fuel cells, geothermal generators, hydropower generators, and/or other devices that generate power from renewable and/or non-renewable energy sources.

Figure 3:
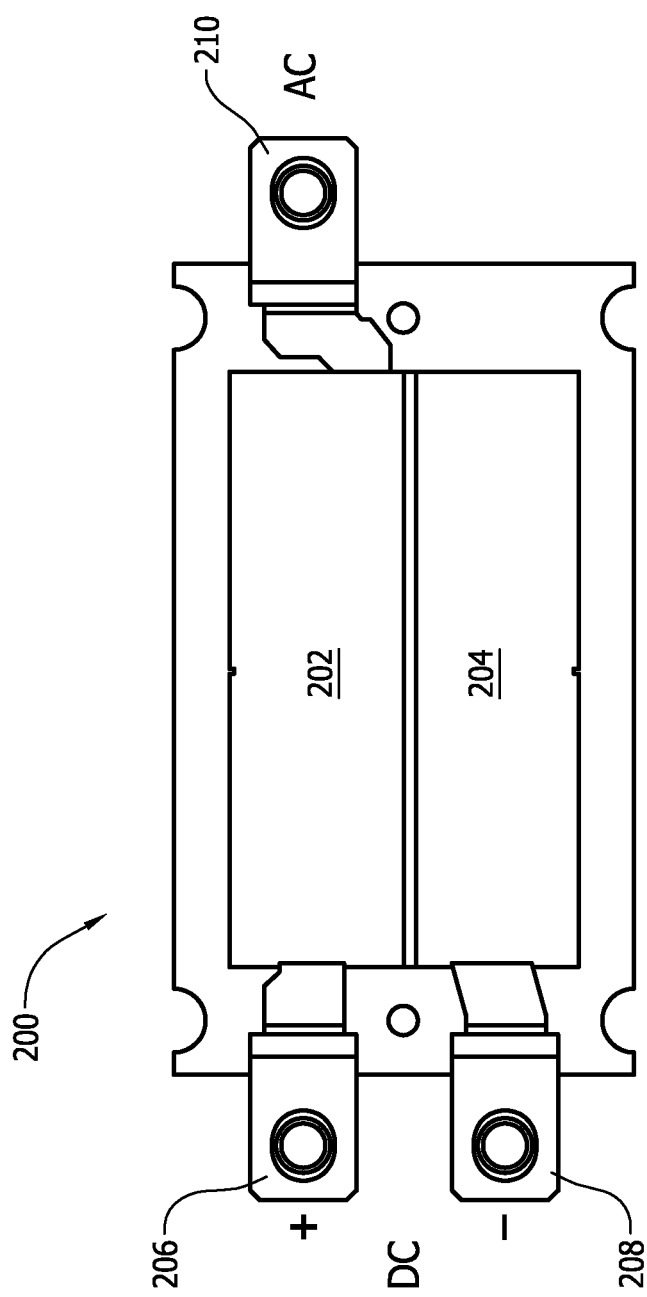
FIG. 3 is a schematic view of a plurality of exemplary insulated gate bipolar transistors (IGBTs) arranged to form an exemplary IGBT phase leg that may be used with the power generation system shown in FIG. 1.

FIG. 3 is a schematic view of an exemplary insulated gate bipolar transistor (IGBT) phase leg 200 that may be used with used with wind turbine generator 100 (shown in FIGS. 1 and 2). IGBT phase leg 200 includes an upper power semiconductor switching device, e.g., an upper IGBT 202 and a lower IGBT 204. Alternatively, any other power semiconductor switching devices that enable operation of power converter 114 (shown in FIG. 2) are used, including, without limitation, gate turn-off thyristors (GTOs). Also, any number of IGBTs that enable operation of IGBT phase leg 200 and power converter 114 as described herein may be used. Each IGBT 202 and 204 includes a gate terminal, an emitter terminal, a collector terminal, and at least one anti-paralleling diode (none shown). Also, in the exemplary embodiment, IGBT phase leg 200 includes a positive DC terminal 206, a negative DC terminal 208, and an AC terminal 210.

Figure 4:
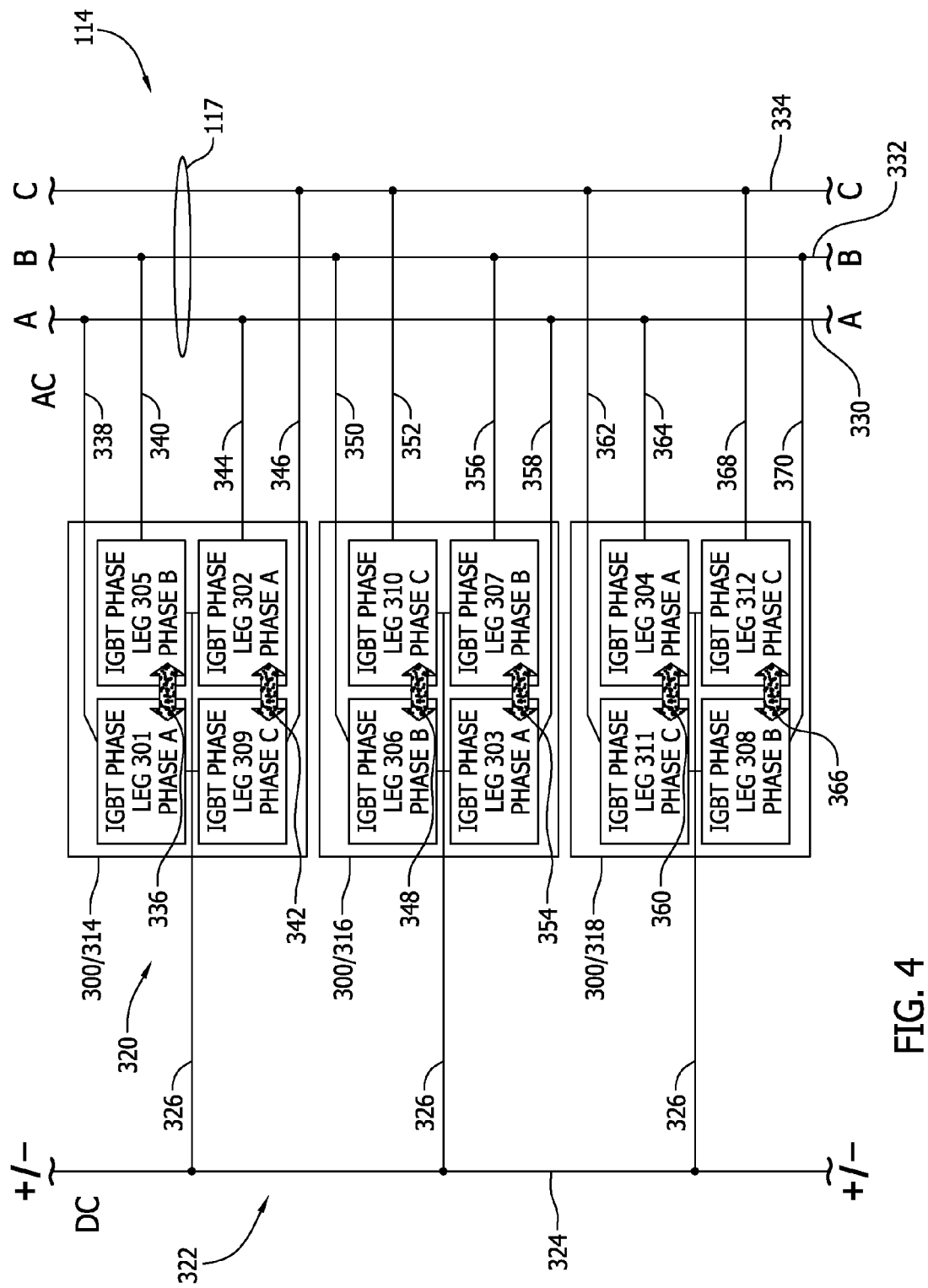
FIG. 4 is a schematic view of an exemplary arrangement of IGBT phase legs into a plurality of exemplary IGBT group assemblies that may be used with the power conversion and transmission system shown in FIG. 2.

FIG. 4 is a schematic view of an exemplary arrangement of IGBT phase legs 200 (shown in FIG. 3) into a plurality of exemplary IGBT group assemblies 300 that may be used with power converter 114 and power conversion and transmission system 111 (shown in FIG. 2). In the exemplary embodiment, twelve IGBT phase legs 200 are used. Specifically, the plurality of IGBT group assemblies 300 includes an IGBT phase leg 301 through an IGBT phase leg 312 positioned in three assemblies 300, i.e., a first IGBT group assembly 314, a second IGBT group assembly 316, and a third IGBT group assembly 318. Alternatively, any number of IGBT group assemblies 300 that enables operation of power converter 114 as described herein is used.

Also, in the exemplary embodiment, an inverter portion 320 of power converter 114 is shown. The embodiments of inverter portion 320 may also be adapted to converter portions (not shown) of power converter 114. The converter portion and inverter portion 320 are coupled through a DC rail system 322. Only one rail 324 is shown. However, both positive and negative DC rails are represented by DC rail 324. Each of IGBT group assemblies 314, 316, and 318 is coupled to DC rail system 322 through a plurality of DC conductors 326 that include both positive and negative DC conductors.

Further, in the exemplary embodiment, inverter portion 320 is coupled to three-phase output conductors 117. Specifically, inverter portion 320 is coupled to an A-phase 330, a B-phase 332, and a C-phase 334 of output conductors 117.

Moreover, in the exemplary embodiment, IGBT phase leg 301 through IGBT phase leg 312 are coupled in a parallel configuration and positioned proximate each other in an interlacing configuration. Specifically, IGBT group assembly 314 includes IGBT phase legs 301 and 305 positioned to define a first branch 336 of IGBT phase legs. IGBT phase leg 301 is coupled to A-phase 330 through an AC conductor 338 and IGBT phase leg 305 is coupled to B-phase 332 through an AC conductor 340. Similarly, IGBT group assembly 314 includes IGBT phase legs 309 and 302 positioned to define a second branch 342 of IGBT phase legs. IGBT phase leg 309 is coupled to C-phase 334 through an AC conductor 346 and IGBT phase leg 302 is coupled to A-phase 330 through an AC conductor 344. Therefore, IGBT group assembly 314 includes a first predetermined subset of IGBT phase legs 301 through 312 positioned in a first predetermined arrangement. Alternatively, IGBT group assembly 314 includes any number of IGBT phase legs that enables operation of IGBT group assembly 314 and power converter 114 as described herein.

Therefore, in the exemplary embodiment, the interlacing configuration of IGBT phase legs 301, 302, 305 and 309 as a subset within IGBT group assembly 314 includes a first predetermined arrangement with respect to a plurality of electrical phases, i.e., A-phase 330, B-phase 332, and C-phase 334. IGBT phase leg 301 that is coupled to A-phase 330 is positioned adjacent to IGBT phase leg 305 that is coupled to B-phase 332 and IGBT phase leg 309 that is coupled to C-phase 334. Similarly, IGBT phase leg 305 that is coupled to B-phase 332 is positioned adjacent to IGBT phase leg 301 that is coupled to A-phase 330, IGBT phase leg 309 that is coupled to C-phase 334, and IGBT phase leg 302 that is coupled to A-phase 330.

In operation, when IGBT phase legs 301, 302, 305 and 309 are conducting to the associated electric phases, an electromagnetic field flux (not shown) is induced proximate each device as a function of the amperage of the electric current conducted therethrough. In general, such induced fields facilitate current imbalances in each of the adjacent IGBT phase legs and positioning IGBT phase legs coupled in parallel to the same electric phase adjacent to each other multiplies the effect. Such positioning of IGBT phase legs 301, 302, 305, and 309 with respect to the plurality of electrical phases facilitates inducing an electric current flow through each of IGBT phase legs 301, 302, 305, and 309 that cancels at least a portion of current imbalances between IGBT phase legs 301, 302, 305, and 309. Such cancelation is facilitated by using negative reinforcement of the associated internal magnetic fluxes as a function of the phase angle differences between the three phases.

In IGBT group assembly 314, IGBT phase legs 301 and 302, both coupled to A-phase 330, are positioned proximate and diagonally with respect to each other. The effect of positioning two IGBT phase legs coupled to the same electric phase adjacent to, and diagonal to, each other is effectively mitigated by the two adjacent IGBT phase legs, each coupled to a different electric phase.

Similarly, in the exemplary embodiment, a second subset of IGBT phase leg 301 through IGBT phase leg 312 is coupled in a parallel configuration and positioned proximate each other in an interlacing configuration. Specifically, IGBT group assembly 316 includes IGBT phase legs 306 and 310 positioned to define a third branch 348 of IGBT phase legs. IGBT phase leg 306 is coupled to B-phase 332 through an AC conductor 350 and IGBT phase leg 310 is coupled to C-phase 334 through an AC conductor 352. Also, similarly, IGBT group assembly 316 includes IGBT phase legs 303 and 307 positioned to define a fourth branch 354 of IGBT phase legs. IGBT phase leg 303 is coupled to A-phase 330 through an AC conductor 358 and IGBT phase leg 307 is coupled to B-phase 332 through an AC conductor 356.

Further, similarly, in the exemplary embodiment, the interlacing configuration of IGBT phase legs 303, 306, 307 and 310 as a subset within IGBT group assembly 316 includes a second predetermined arrangement with respect to A-phase 330, B-phase 332, and C-phase 334. IGBT phase leg 306 that is coupled to B-phase 332 is positioned adjacent to IGBT phase leg 310 that is coupled to C-phase 334 and IGBT phase leg 303 that is coupled to A-phase 330. Similarly, IGBT phase leg 310 that is coupled to C-phase 334 is positioned adjacent to IGBT phase leg 306 that is coupled to B-phase 332, IGBT phase leg 303 that is coupled to A-phase 330, and IGBT phase leg 307 that is coupled to B-phase 332.

In operation, when IGBT phase legs 303, 306, 307 and 310 are conducting to the associated electric phases, the effects described above for IGBT phase legs 301, 302, 305, and 309 with respect to negative reinforcement of the induced electromagnetic field fluxes due to the phase angle differences between the three phases are substantially replicated. In IGBT group assembly 316, IGBT phase legs 306 and 307, both coupled to B-phase 332, are positioned proximate and diagonally with respect to each other. The effect of positioning two IGBT phase legs coupled to the same electric phase adjacent to, and diagonal to, each other is effectively mitigated by the two adjacent IGBT phase legs, each coupled to a different electric phase.

Moreover, similarly, in the exemplary embodiment, a third subset of IGBT phase leg 301 through IGBT phase leg 312 is coupled in a parallel configuration and positioned proximate each other in an interlacing configuration. Specifically, IGBT group assembly 318 includes IGBT phase legs 311 and 304 positioned to define a fifth branch 360 of IGBT phase legs. IGBT phase leg 311 is coupled to C-phase 334 through an AC conductor 362 and IGBT phase leg 304 is coupled to A-phase 330 through an AC conductor 364. Also, similarly, IGBT group assembly 318 includes IGBT phase legs 308 and 312 positioned to define a sixth branch 366 of IGBT phase legs. IGBT phase leg 308 is coupled to B-phase 332 through an AC conductor 370 and IGBT phase leg 312 is coupled to C-phase 334 through an AC conductor 368.

Also, similarly, in the exemplary embodiment, the interlacing configuration of IGBT phase legs 304, 308, 311 and 312 as a subset within IGBT group assembly 318 includes a third predetermined arrangement with respect to A-phase 330, B-phase 332, and C-phase 334. IGBT phase leg 311 that is coupled to C-phase 334 is positioned adjacent to IGBT phase leg 304 that is coupled to A-phase 330 and IGBT phase leg 308 that is coupled to B-phase 332. Similarly, IGBT phase leg 304 that is coupled to A-phase 330 is positioned adjacent to IGBT phase leg 311 that is coupled to C-phase 334, IGBT phase leg 308 that is coupled to B-phase 332, and IGBT phase leg 312 that is coupled to C-phase 334.

In operation, when IGBT phase legs 304, 308, 311 and 312 are conducting to the associated electric phases, the effects described above for IGBT phase legs 301, 302, 305, and 309 with respect to negative reinforcement of the induced electromagnetic field fluxes due to the phase angle differences between the three phases are substantially replicated. In IGBT group assembly 318, IGBT phase legs 311 and 312, both coupled to C-phase 334, are positioned proximate and diagonally with respect to each other. The effect of positioning two IGBT phase legs coupled to the same electric phase adjacent to, and diagonal to, each other is effectively mitigated by the two adjacent IGBT phase legs, each coupled to a different electric phase.

In the exemplary embodiment, power converter 114 includes three distinct subsets of IGBT phase legs 301 through 312 in three distinct predetermined arrangements, i.e., IGBT group assemblies 314, 316, and 318 coupled to output conductors 117 in parallel to each other. Therefore, the three IGBT group assemblies 314, 316, and 318 fully define the interlacing configuration of IGBT phase legs 301 through 312 in power converter 114. The interlacing configuration shown in FIG. 4 is defined by positioning IGBT phase legs 301 through 312 in a pattern of A, B, C, A, B, C, A, B, C, A, B, C with respect to the three electrical phases from the upper left-hand side to the lower right-hand side.

While the individual arrangements in each of IGBT group assemblies 314, 316, and 318 facilitate negative reinforcement of the induced electromagnetic field fluxes in each therein due to the phase angle differences between the three phases, a similar effect is realized on a larger scale when positioning IGBT group assemblies 314, 316, and 318 within power converter 114.

Specifically, in the exemplary embodiment, power converter 114 includes a first outer semiconductor switching device branch, i.e., first branch 336. Power converter 114 also includes a second outer semiconductor switching device branch, i.e., sixth branch 366. Power converter 114 further includes a plurality of inner semiconductor switching device branches, i.e., second branch 342, third branch 348, fourth branch 354, and fifth branch 360 between first branch 336 and sixth branch 366. In addition, within power converter 114, IGBT group assemblies 314, 316, and 318 define branches 336, 342, 348, 354, 360, and 366 such that no two of IGBT phase legs 301 through 312 in any of parallel branches 336, 342, 348, 354, 360, and 366 is coupled to the same electrical phase.

The combined effects of the current being conducted through the six branches 336, 342, 348, 354, 360, and 366 facilitates a cancellation of internal magnetic fluxes induced proximate the four inner branches 342, 348, 354, and 360. Therefore, the internal magnetic fields induced proximate second branch 342, third branch 348, fourth branch 354, and fifth branch 360 are canceled. Moreover, the current imbalances that are typically manifested as higher currents on outside branches of parallel IGBTs as compared to inside branches of IGBTs are significantly reduced. Specifically, the electric currents conducted through the six branches 336, 342, 348, 354, 360, and 366 approach more balanced values. The overall effect is greater electric current being conducted through the four inner branches 342, 348, 354, and 360 such that they conduct closer to their rated capabilities. As such, greater electric current is conducted through power converter 114.

Subsequent effects of balancing current conduction through branches 336, 342, 348, 354, 360, and 366 include facilitating IGBTs 202 and 204 (both shown in FIG. 3) in each of branches 336, 342, 348, 354, 360, and 366 attaining junction temperature rise values that are less disparate. Also, turn-on losses, on-state current sharing, peak turn-on and turn-off currents, and the associated thermal stresses of IGBTs 202 and 204 are balanced while conducting in the on-state. Such balancing across branches 336, 342, 348, 354, 360, and 366 facilitates increasing overall power conduction and reliability thereof.

Figure 5:
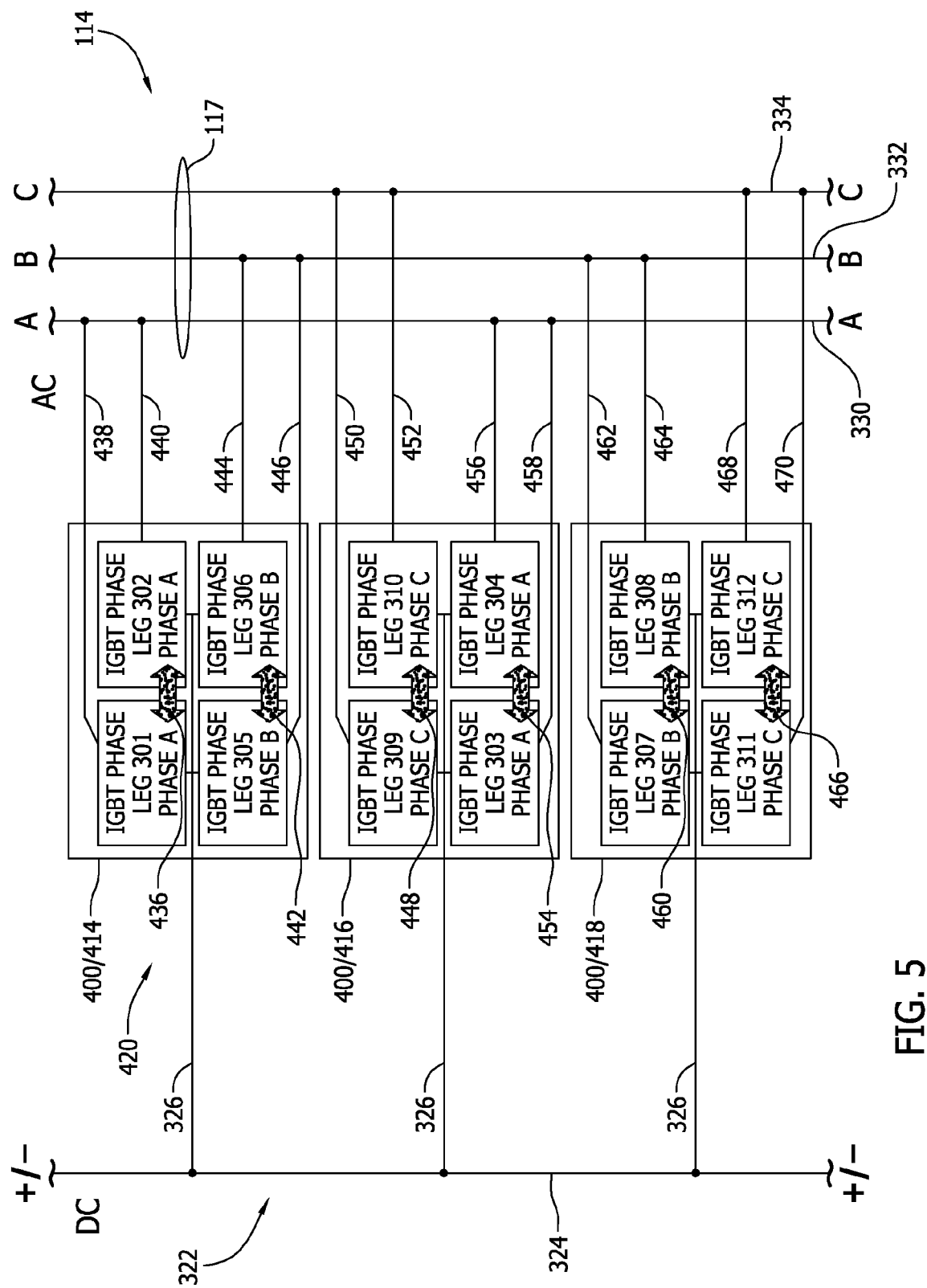
FIG. 5 is a schematic view of an alternative exemplary arrangement of IGBT phase legs into a plurality of alternative exemplary IGBT group assemblies that may be used with the power conversion and transmission system shown in FIG. 2.

FIG. 5 is a schematic view of an alternative exemplary arrangement of IGBT phase legs 200 (shown in FIG. 3) into a plurality of alternative exemplary IGBT group assemblies 400 that may be used with power converter 114 and power conversion and transmission system 111 (shown in FIG. 2). In the exemplary embodiment, twelve IGBT phase legs 200 are used. Specifically, the plurality of IGBT group assemblies 400 includes IGBT phase legs 301 through 312 positioned in three assemblies 400, i.e., a first IGBT group assembly 414, a second IGBT group assembly 416, and a third IGBT group assembly 418. Alternatively, any number of IGBT group assemblies 400 that enables operation of power converter 114 as described herein is used.

Also, in the exemplary embodiment, an alternative inverter portion 420 of power converter 114, DC rail system 322, DC rail 324, DC conductors 326, and three-phase output conductors 117, A-phase 330, B-phase 332, and C-phase 334 are shown.

Moreover, in the exemplary embodiment, IGBT phase legs 301 through 312 are coupled in a parallel configuration and positioned proximate each other in an interlacing configuration. Specifically, IGBT group assembly 414 includes IGBT phase legs 301 and 302 positioned to define a first branch 436 of IGBT phase legs. Both IGBT phase legs 301 and 302 are coupled to A-phase 330 through an AC conductor 438 and an AC conductor 440, respectively. Similarly, IGBT group assembly 414 includes IGBT phase legs 305 and 306 positioned to define a second branch 442 of IGBT phase legs. Both IGBT phase legs 305 and 306 are coupled to B-phase 332 through an AC conductor 446 and an AC conductor 444, respectively. Therefore, IGBT group assembly 414 includes a first predetermined subset of IGBT phase legs 301 through 312 positioned in a first predetermined arrangement. Alternatively, IGBT group assembly 414 includes any number of IGBT phase legs that enables operation of IGBT group assembly 414 and power converter 114 as described herein.

Therefore, in the exemplary embodiment, the interlacing configuration of IGBT phase legs 301, 302, 305 and 306 as a subset within IGBT group assembly 414 includes a first predetermined arrangement with respect to a plurality of electrical phases, i.e., A-phase 330 and B-phase 332. IGBT phase legs 301 and 302 that are coupled to A-phase 330 are positioned adjacent to IGBT phase legs 305 and 306 that are coupled to B-phase 332.

In operation, when IGBT phase legs 301, 302, 305 and 306 are conducting to the associated electric phases, an electromagnetic field flux (not shown) is induced proximate each device as a function of the amperage of the electric current conducted therethrough. In general, such induced fields facilitate current imbalances in each of the adjacent IGBT phase legs and positioning IGBT phase legs coupled in parallel to the same electric phase adjacent to each other multiplies the effect. Such positioning of IGBT phase legs 301, 302, 305, and 306 with respect to the plurality of electrical phases facilitates inducing an electric current flow through each of IGBT phase legs 301, 302, 305, and 306 that cancels at least a portion of current imbalances between IGBT phase legs 301, 302, 305, and 306. Such cancelation is facilitated by using negative reinforcement of the associated internal magnetic fluxes as a function of the phase angle differences between the two phases.

Similarly, in the exemplary embodiment, a second subset of IGBT phase legs 301 through 312 is coupled in a parallel configuration and positioned proximate each other in an interlacing configuration. Specifically, IGBT group assembly 416 includes IGBT phase legs 309 and 310 positioned to define a third branch 448 of IGBT phase legs. Both IGBT phase legs 309 and 310 are coupled to C-phase 334 through an AC conductor 450 and AC conductor 452, respectively. Also, similarly, IGBT group assembly 416 includes IGBT phase legs 303 and 304 positioned to define a fourth branch 454 of IGBT phase legs. Both IGBT phase legs 303 and 304 are coupled to A-phase 330 through an AC conductor 458 and an AC conductor 456, respectively.

Further, similarly, in the exemplary embodiment, the interlacing configuration of IGBT phase legs 303, 304, 309 and 310 as a subset within IGBT group assembly 416 includes a second predetermined arrangement with respect to A-phase 330 and C-phase 334. IGBT phase legs 303 and 304 that are coupled to A-phase 330 are positioned adjacent to IGBT phase legs 309 and 310 that are coupled to C-phase 334.

In operation, when IGBT phase legs 303, 304, 309 and 310 are conducting to the associated electric phases, the effects described above for IGBT phase legs 301, 302, 305, and 306 with respect to negative reinforcement of the induced electromagnetic field fluxes due to the phase angle differences between the three phases are substantially replicated.

Moreover, similarly, in the exemplary embodiment, a third subset of IGBT phase legs 301 through 312 is coupled in a parallel configuration and positioned proximate each other in an interlacing configuration. Specifically, IGBT group assembly 418 includes IGBT phase legs 307 and 308 positioned to define a fifth branch 460 of IGBT phase legs. Both IGBT phase legs 307 and 308 are coupled to B-phase 332 through an AC conductor 462 and an AC conductor 464, respectively. Also, similarly, IGBT group assembly 418 includes IGBT phase legs 311 and 312 positioned to define a sixth branch 466 of IGBT phase legs. Both IGBT phase legs 311 and 312 are coupled to C-phase 334 through an AC conductor 470 and an AC conductor 468, respectively.

Also, similarly, in the exemplary embodiment, the interlacing configuration of IGBT phase legs 307, 308, 311 and 312 as a subset within IGBT group assembly 418 includes a third predetermined arrangement with respect to B-phase 332 and C-phase 334. IGBT phase legs 307 and 308 that are coupled to B-phase 332 are positioned adjacent to IGBT phase legs 311 and 312 that are coupled to C-phase 334.

In operation, when IGBT phase legs 307, 308, 311 and 312 are conducting to the associated electric phases, the effects described above for IGBT phase legs 301, 302, 305, and 306 with respect to negative reinforcement of the induced electromagnetic field fluxes due to the phase angle differences between the three phases are substantially replicated.

In the exemplary embodiment, power converter 114 includes three distinct subsets of IGBT phase legs 301 through 312 in three distinct predetermined arrangements, i.e., IGBT group assemblies 414, 416, and 418 coupled to output conductors 117 in parallel to each other. Therefore, the three IGBT group assemblies 414, 416, and 418 fully define the interlacing configuration of IGBT phase legs 301 through 312 in power converter 114. The interlacing configuration shown in FIG. 5 is defined by positioning IGBT phase legs 301 through 312 in a pattern of A, A, B, B, C, C, A, A, B, B, C, C with respect to the three electrical phases from the upper left-hand side to the lower right-hand side.

While the individual arrangements in each of IGBT group assemblies 414, 416, and 418 facilitate negative reinforcement of the induced electromagnetic field fluxes in each therein due to the phase angle differences between the three phases, a similar effect is realized on a larger scale when positioning IGBT group assemblies 414, 416, and 418 within power converter 114.

Specifically, in the exemplary embodiment, power converter 114 includes a first outer semiconductor switching device branch, i.e., first branch 436. Power converter 114 also includes a second outer semiconductor switching device branch, i.e., sixth branch 466. Power converter 114 further includes a plurality of inner semiconductor switching device branches, i.e., second branch 442, third branch 448, fourth branch 454, and fifth branch 460 between first branch 436 and sixth branch 466. In addition, within power converter 114, IGBT group assemblies 414, 416, and 418 define branches 436, 442, 448, 454, 460, and 466 such that the two IGBT phase legs 301 through 312 in any of parallel branches 436, 442, 448, 454, 460, and 466 are coupled to the same electrical phase.

The combined effects of the current being conducted through the six branches 436, 442, 448, 454, 460, and 466 are similar to those for branches 336, 342, 348, 354, 360, and 366 (all shown in FIG. 4).

Figure 6:
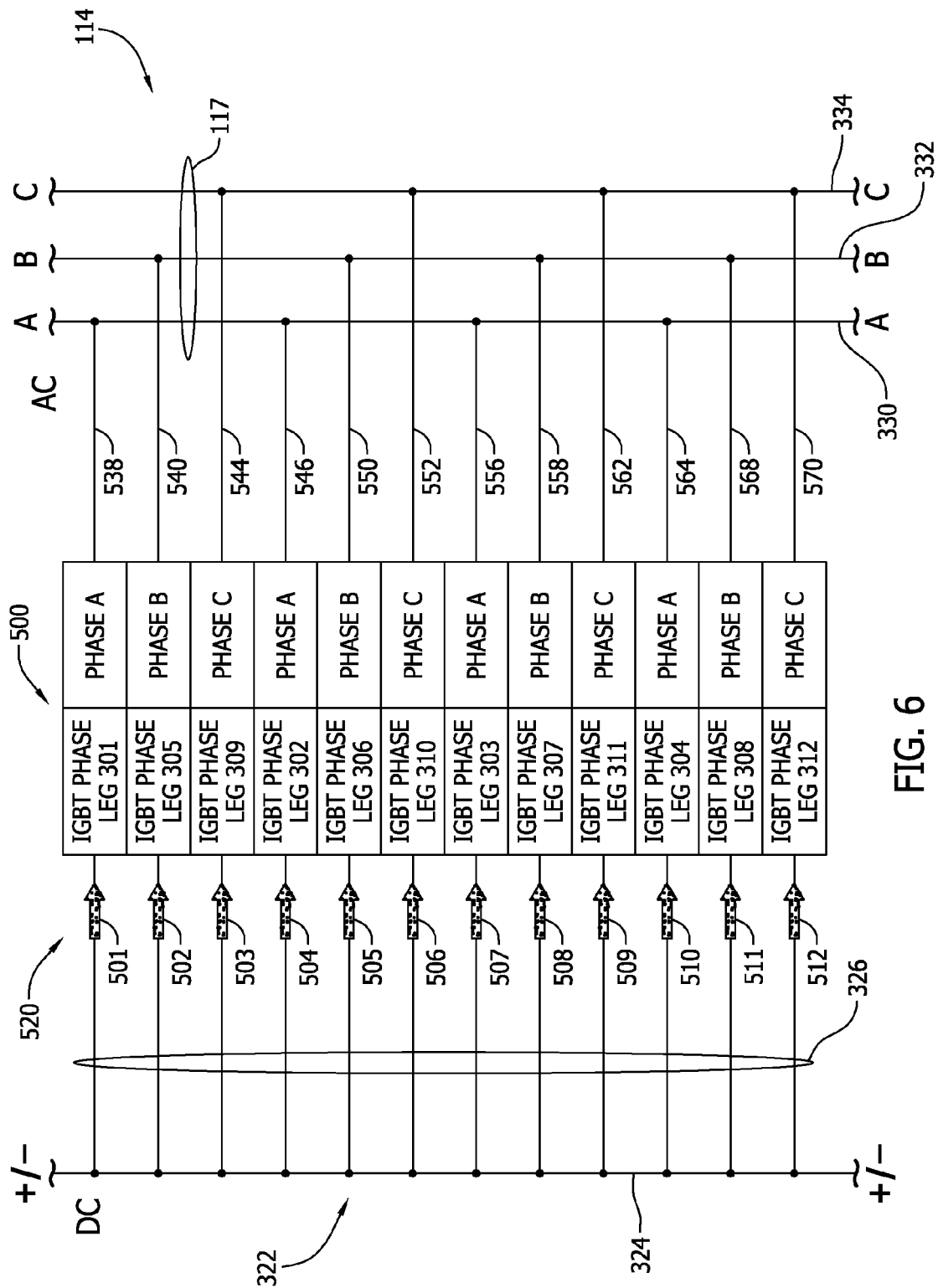
FIG. 6 is a schematic view of another alternative exemplary arrangement of IGBT phase legs into an alternative exemplary IGBT group assembly that may be used with the power conversion and transmission system shown in FIG. 2.

FIG. 6 is a schematic view of another alternative exemplary arrangement of IGBT phase legs 200 (shown in FIG. 3) into an alternative exemplary IGBT group assembly 500 that may be used with power converter 114 and power conversion and transmission system 111 (shown in FIG. 2). In the exemplary embodiment, twelve IGBT phase legs 200 are used. Specifically, IGBT group assembly 500 includes IGBT phase legs 301 through 312 positioned in a single assembly 500. Alternatively, any number of IGBT group assemblies 500 that enables operation of power converter 114 as described herein is used.

Also, in the exemplary embodiment, an alternative inverter portion 520 of power converter 114, DC rail system 322, DC rail 324, DC conductors 326, and three-phase output conductors 117, A-phase 330, B-phase 332, and C-phase 334 are shown.

Moreover, in the exemplary embodiment, IGBT phase legs 301 through 312 are coupled in a parallel configuration and positioned proximate each other in an interlacing configuration. Specifically, IGBT group assembly 500 includes IGBT phase legs 301 through 312 positioned to define a plurality of branches 501 through 512. IGBT phase legs 301 through 312 are interdigitated such that no two adjacent IGBT phase legs are coupled to the same electrical phase 330, 332, and 334 of the three-phase power conversion and transmission system 111.

More specifically, the sequence includes first branch 501 that includes IGBT phase leg 301 coupled to A-phase 330 through an AC conductor 538, second branch 502 that includes IGBT phase leg 305 coupled to B-phase 332 through an AC conductor 540, and third branch 503 that includes IGBT phase leg 309 coupled to C-phase 334 through an AC conductor 544. A repetition of the sequence includes fourth branch 504 that includes IGBT phase leg 302 coupled to A-phase 330 through an AC conductor 546, fifth branch 505 that includes IGBT phase leg 306 coupled to B-phase 332 through an AC conductor 550, and sixth branch 506 that includes IGBT phase leg 310 coupled to C-phase 334 through an AC conductor 552. Another repetition of the sequence includes seventh branch 507 that includes IGBT phase leg 303 coupled to A-phase 330 through an AC conductor 556, eighth branch 508 that includes IGBT phase leg 307 coupled to B-phase 332 through an AC conductor 558, and ninth branch 509 that includes IGBT phase leg 311 coupled to C-phase 334 through an AC conductor 562. Yet another repetition of the sequence includes tenth branch 510 that includes IGBT phase leg 304 coupled to A-phase 330 through an AC conductor 564, eleventh branch 511 that includes IGBT phase leg 308 coupled to B-phase 332 through an AC conductor 568, and twelfth branch 512 that includes IGBT phase leg 312 coupled to C-phase 334 through an AC conductor 570. Therefore, IGBT group assembly 500 includes a predetermined subset of IGBT phase legs 301 through 312 positioned in a predetermined, interdigitated arrangement. Alternatively, IGBT group assembly 500 includes any number of IGBT phase legs that enables operation of IGBT group assembly 500 and power converter 114 as described herein.

Therefore, in the exemplary embodiment, the interlaced/interdigitated configuration of IGBT phase legs 301 through 312 as a subset within IGBT group assembly 500 includes a predetermined arrangement with respect to a plurality of electrical phases, i.e., A-phase 330, B-phase 332, and C-phase 334. Specifically, each of IGBT phase legs 301, 302, 303, and 304 that are coupled to A-phase 330 are separated by and positioned adjacent to IGBT phase legs 305, 306, 307, and 308 that are coupled to B-phase 332 and IGBT phase legs 309, 310, 311, and 312 that are coupled to C-phase 334. The interlacing configuration shown in FIG. 6 is defined by positioning IGBT phase legs 301 through 312 in a pattern of A, B, C, A, B, C, A, B, C, A, B, C with respect to the three electrical phases from the uppermost branch to the lowermost branch.

In operation, when IGBT phase legs 301 through 312 are conducting to the associated electric phases, an electromagnetic field flux (not shown) is induced proximate each device as a function of the amperage of the electric current conducted therethrough. In general, such induced fields facilitate current imbalances in each of the adjacent IGBT phase legs and positioning IGBT phase legs coupled in parallel to the same electric phase adjacent to each other multiplies the effect. Such positioning of IGBT phase legs 301 through 312 with respect to the plurality of electrical phases facilitates inducing an electric current flow through each of IGBT phase legs 301 through 312 that cancels at least a portion of current imbalances between IGBT phase legs 301 through 312. Such cancelation is facilitated by using negative reinforcement of the associated internal magnetic fluxes as a function of the phase angle differences between the three phases.

Figure 7:
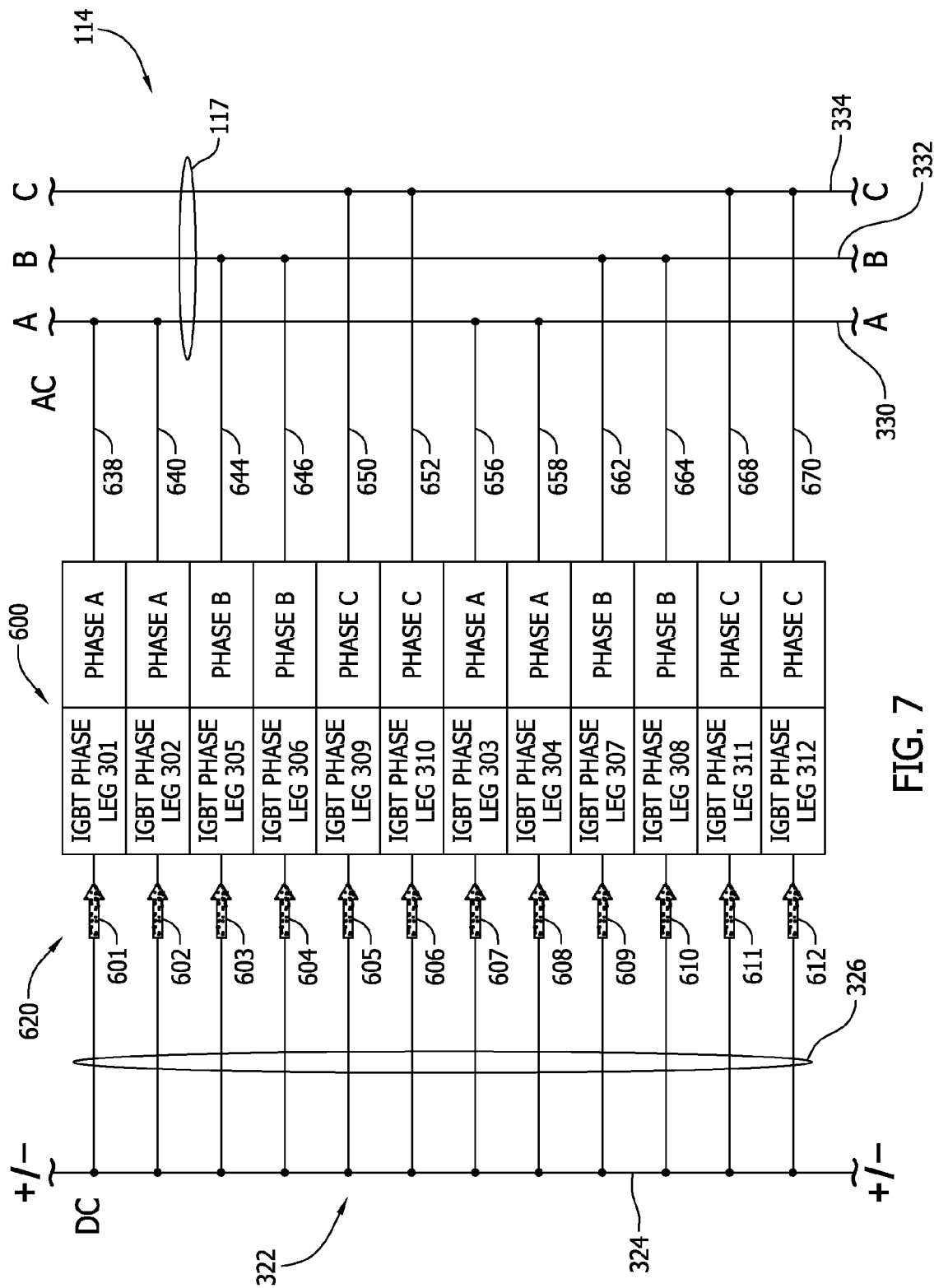
FIG. 7 is a schematic view of yet another alternative exemplary arrangement of IGBT phase legs into another alternative exemplary IGBT group assembly that may be used with the power conversion and transmission system shown in FIG. 2.

FIG. 7 is a schematic view of yet another alternative exemplary arrangement of IGBT phase legs 200 (shown in FIG. 3) into another alternative exemplary IGBT group assembly 600 that may be used with power converter 114 and power conversion and transmission system 111 (shown in FIG. 2). In the exemplary embodiment, twelve IGBT phase legs 200 are used. Specifically, IGBT group assembly 600 includes IGBT phase legs 301 through 312 positioned in a single assembly 600. Alternatively, any number of IGBT group assemblies 600 that enables operation of power converter 114 as described herein is used.

Also, in the exemplary embodiment, an alternative inverter portion 620 of power converter 114, DC rail system 322, DC rail 324, DC conductors 326, and three-phase output conductors 117, A-phase 330, B-phase 332, and C-phase 334 are shown.

Moreover, in the exemplary embodiment, IGBT phase legs 301 through 312 are coupled in a parallel configuration and positioned proximate each other in an interlacing configuration. Specifically, IGBT group assembly 600 includes IGBT phase legs 301 through 312 positioned to define a plurality of branches 601 through 612. IGBT phase legs 301 through 312 are interdigitated such that sets of two adjacent IGBT phase legs are coupled to the same electrical phase 330, 332, and 334 of the three-phase power conversion and transmission system 111.

More specifically, the sequence includes first branch 601 and second branch 602 that includes adjacent IGBT phase legs 301 and 302, respectively, coupled to A-phase 330 through AC conductors 638 and 640, respectively. The sequence also includes third branch 603 and fourth branch 604 that includes adjacent IGBT phase legs 305 and 306, respectively, coupled to B-phase 332 through AC conductors 644 and 646, respectively. The sequence further includes fifth branch 605 and sixth branch 606 that includes adjacent IGBT phase legs 309 and 310, respectively, coupled to C-phase 334 through AC conductors 650 and 652, respectively. The sequence also includes seventh branch 607 and eighth branch 608 that includes adjacent IGBT phase legs 303 and 304, respectively, coupled to A-phase 330 through AC conductors 656 and 658, respectively. The sequence further includes ninth branch 609 and tenth branch 610 that includes adjacent IGBT phase legs 307 and 308, respectively, coupled to B-phase 332 through AC conductors 662 and 664, respectively. The sequence also includes eleventh branch 611 and twelfth branch 612 that includes adjacent IGBT phase legs 311 and 312, respectively, coupled to C-phase 334 through AC conductors 668 and 670, respectively. Therefore, IGBT group assembly 600 includes a predetermined subset of IGBT phase legs 301 through 312 positioned in a predetermined, interdigitated arrangement. Alternatively, IGBT group assembly 600 includes any number of IGBT phase legs that enables operation of IGBT group assembly 600 and power converter 114 as described herein.

Therefore, in the exemplary embodiment, the interlaced/interdigitated configuration of IGBT phase legs 301 through 312 as a subset within IGBT group assembly 600 includes a predetermined arrangement with respect to a plurality of electrical phases, i.e., A-phase 330, B-phase 332, and C-phase 334. Specifically, pairs of IGBT phase legs 301, 302, 303, and 304 that are coupled to A-phase 330 are separated by and positioned adjacent to pairs of IGBT phase legs 305, 306, 307, and 308 that are coupled to B-phase 332 and pairs of IGBT phase legs 309, 310, 311, and 312 that are coupled to C-phase 334. The interlacing configuration shown in FIG. 7 is defined by positioning IGBT phase legs 301 through 312 in a pattern of A, A, B, B, C, C, A, A, B, B, C, C with respect to the three electrical phases from the uppermost branch to the lowermost branch.

In operation, when IGBT phase legs 301 through 312 are conducting to the associated electric phases, an electromagnetic field flux (not shown) is induced proximate each device as a function of the amperage of the electric current conducted therethrough. In general, such induced fields facilitate current imbalances in each of the adjacent IGBT phase legs and positioning IGBT phase legs coupled in parallel to the same electric phase adjacent to each other multiplies the effect. Such positioning of IGBT phase legs 301 through 312 in adjacent pairs with respect to the plurality of electrical phases facilitates inducing an electric current flow through each of IGBT phase legs 301 through 312 that cancels at least a portion of current imbalances between IGBT phase legs 301 through 312. Such cancelation is facilitated by using negative reinforcement of the associated internal magnetic fluxes as a function of the phase angle differences between the three phases.

The above-described embodiments facilitate efficient and cost-effective operation of electric power generation assets, including renewable electric power generation facilities such as wind turbine generators and a solar arrays, and non-renewable electric power generation facilities such as fossil fuel and nuclear power plants. The above-described embodiments also facilitate efficient and cost-effective operation of motor drive devices. The electric power generation facilities and motor drive devices include a power converter that facilitates generating and transmitting increased electric power using power converters with a smaller physical footprint. More specifically, the power converter described herein facilitates improving the current output of a plurality of parallel connected power semiconductors by substantially canceling out externally induced magnetic fields associated with adjacent power semiconductor devices. The equalization effects result in better sharing of current through each power semiconductor device and each output current conductor. Therefore, such power semiconductor configurations facilitate use of compact power converters with sufficient power ratings without similarly increasing the size of the power converters.

Exemplary embodiments of power converters are described above in detail. The power converters are not limited to the specific embodiments described herein, but rather, components of the power converters may be utilized independently and separately from other components and/or steps described herein. For example, the power converters may also be used in combination with other industrial power conversion systems and electric power generation systems, and are not limited to practice with only the renewable electric power generation facilities as described herein. Rather, the exemplary embodiment can be implemented and utilized in connection with many other system and facility applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power converter comprising:
   a plurality of electrical phases, said power converter coupled to a plurality of output conductors, each electrical phase of said plurality of electrical phases coupled to a respective output conductor, said each electrical phase comprising:
      a plurality of phase legs comprising a plurality of semiconductor switching devices, each phase leg positioned proximate each other in an interlacing configuration with respect to another phase leg that corresponds to a different electrical phase of said plurality of electrical phases, said interlacing configuration comprises a plurality of parallel branches of said plurality of phase legs comprising at least two outer branches and at least one inner branch, said inner branch and said outer branches at least partially cancel an internal magnetic flux induced proximate said inner branch, thereby substantially balancing an electric current flow through said inner branch and said outer branches; and,
      a plurality of alternating current (AC) conductors, at least one AC conductor of said plurality of AC conductors coupled to a respective phase leg of said plurality of phase legs and the respective output conductor, said plurality of AC conductors extend from said plurality of phase legs to the plurality of output conductors in a parallel configuration.

2. The power converter in accordance with claim 1, wherein said interlacing configuration further comprises a subset of said plurality of phase legs comprising at least one first phase leg at least partially defining a first electrical phase and at least one second phase leg at least partially defining a second electrical phase, wherein said first phase leg and said second phase leg are positioned adjacent each other.

3. The power converter in accordance with claim 1, wherein said plurality of phase legs comprise:
   a first subset of said plurality of phase legs positioned in a first arrangement; and,
   a second subset of said plurality of phase legs positioned in a second arrangement, wherein said first arrangement and said second arrangement at least partially define said interlacing configuration.

4. The power converter in accordance with claim 1, wherein said plurality of phase legs at least partially define at least one group assembly comprising at least two of:
   at least one of said plurality of phase legs at least partially defining a first electrical phase of a three-phase electrical system;
   at least one of said plurality of phase legs at least partially defining a second electrical phase of the three-phase electrical system; and,
   at least one of said plurality of phase legs at least partially defining a third electrical phase of the three-phase electrical system.

5. The power converter in accordance with claim 4, wherein said group assembly comprises a plurality of group assemblies configured in a parallel configuration.

6. The power converter in accordance with claim 5, wherein said group assembly defines a plurality of parallel branches, wherein each of said parallel branches comprises a portion of said plurality of phase legs, wherein no two of said plurality of phase legs in any of said parallel branches at least partially defines a same electrical phase of said plurality of electrical phases.

7. The power converter in accordance with claim 1, wherein said plurality of phase legs form at least one group assembly, wherein:
   a first plurality of said plurality of phase legs at least partially defining a first electrical phase of a three-phase electrical system; and,
   a second plurality of said plurality of phase legs at least partially defining a second electrical phase of the three-phase electrical system.

8. The power converter in accordance with claim 7, wherein said group assembly comprises a plurality of group assemblies configured in a parallel configuration.

9. The power converter in accordance with claim 7, wherein said group assembly defines a plurality of parallel branches, wherein each of said parallel branches comprises at least a portion of said plurality of phase legs, wherein two of said plurality of phase legs in any of said parallel branches at least partially defines a same electrical phase of said plurality of electrical phases.

10. The power converter in accordance with claim 1, wherein said plurality of phase legs form at least one group assembly comprising a plurality of parallel branches comprising:
    a first outer branch comprising one of said plurality of phase legs at least partially defining a first electrical phase of a three-phase electrical system;
    a second outer branch comprising one of said plurality of phase legs at least partially defining a second electrical phase of the three-phase electrical system; and,
    at least one inner branch comprising at least one of said plurality of phase legs at least partially defining a third electrical phase of the three-phase electrical system.

11. The power converter in accordance with claim 10, wherein said branches are interlaced such that no two adjacent phase legs at least partially define a same electrical phase of the three-phase electrical system.

12. A method of operating a power converter that includes a plurality of electrical phases including a plurality of phase legs coupled in a parallel configuration and positioned proximate each other in an interlacing configuration, said method comprising:
    coupling the power converter to a plurality of output conductors through a plurality of alternating current (AC) conductors, at least one respective AC conductor of the plurality of AC conductors coupled to a respective phase leg of the plurality of phase legs, the plurality of AC conductors extending from the plurality of phase legs to the plurality of output conductors in a parallel configuration, wherein each of the plurality of phase legs are positioned proximate each other in an interlacing configuration with respect to another phase leg that corresponds to a different electrical phase of the plurality of electrical phase;
    placing at least a portion of the plurality of phase legs in a conducting mode of operation and inducing an electric current flow through each of the conducting phase legs; and,
    canceling at least a portion of current imbalances between the plurality of conducting phase legs comprising at least partially cancelling a magnetic flux induced proximate at least some of the conducting phase legs comprising transmitting electric current to the plurality of output conductors through a plurality of parallel branches of the plurality of phase legs, wherein the plurality of parallel branches includes at least two outer branches and at least one inner branch, wherein the inner branch and the outer branches at least partially cancel an internal magnetic flux induced proximate the inner branch, thereby substantially balancing the electric current flow through the inner branch and the outer branches.

13. The method in accordance with claim 12, wherein at least partially cancelling an internal magnetic flux induced proximate at least some of the conducting semiconductor switching devices further comprises transmitting electric current to the plurality of output conductors through a predetermined subset of the conducting phase legs, wherein the subset includes at least one first phase leg conducting through a first electrical phase and at least one second phase leg conducting to a second electrical phase, wherein the first conducting phase leg and the second conducting phase leg are positioned adjacent to each other.

14. An electric power system comprising:
at least one direct current (DC) conductor;
a plurality of alternating current (AC) conductors;
a plurality of output conductors coupled to said plurality of AC conductors; and,
a power converter coupled to each of said DC conductor and said plurality of AC conductors, wherein said power converter comprises a plurality of electrical phases comprising a plurality of phase legs, said plurality of phase legs comprising a plurality of semiconductor switching devices, said plurality of phase legs positioned proximate each other in an interlacing configuration with respect to another phase leg that corresponds to a different electrical phase of said plurality of electrical phases, said interlacing configuration comprises a plurality of parallel branches of said plurality of phase legs comprising at least two outer branches and at least one inner branch, said inner branch and said outer branches at least partially cancel an internal magnetic flux induced proximate said inner branch, thereby substantially balancing an electric current flow through said inner branch and said outer branches, at least one AC conductor of said plurality of AC conductors coupled to a respective phase leg of said plurality of phase legs and a respective output conductor of said plurality of output conductors, said plurality of AC conductors extend from said plurality of phase legs to said plurality of output conductors in a parallel configuration.

15. The electric power system in accordance with claim 14, wherein said interlacing configuration further comprises a subset of said plurality of phase legs comprising at least one first phase leg at least partially defining a first electrical phase and at least one second phase leg at least partially defining a second electrical phase, wherein said first phase leg and said second phase leg are positioned adjacent each other.

16. The electric power system in accordance with claim 14, wherein said plurality of phase legs comprise:
a first subset of said plurality of phase legs positioned in a first arrangement; and,
a second subset of said plurality of phase legs positioned in a second arrangement, wherein said first arrangement and said second arrangement at least partially define said interlacing configuration.

\* \* \* \* \*